Oct. 17, 1950     R. F. HOFFMAN ET AL     2,526,478
COLD PROCESS WATER SOFTENER
Filed Jan. 21, 1948
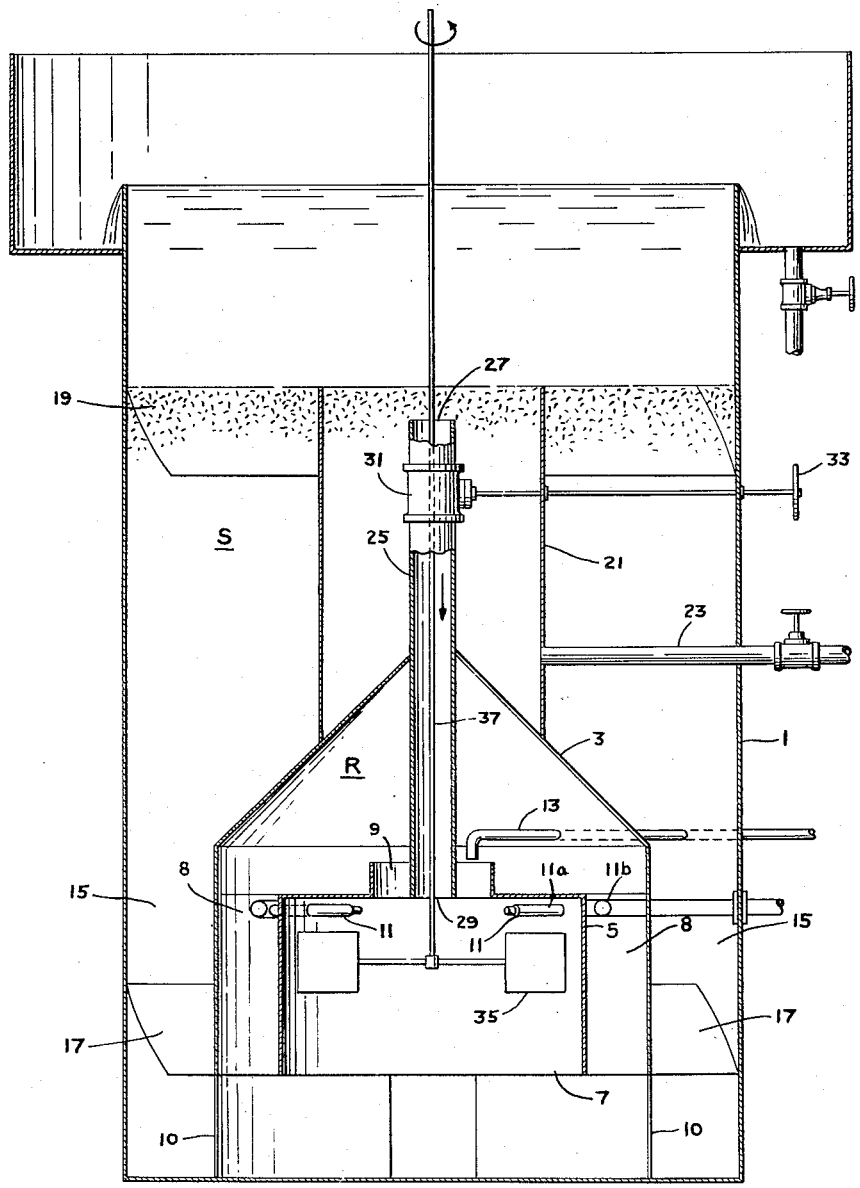
ROBERT F. HOFFMAN
GEORGE P. CLEMENT
           *INVENTOR.*
BY Patented Oct. 17, 1950

2,526,478

UNITED STATES PATENT OFFICE 2,526,478

COLD PROCESS WATER SOFTENER

Robert F. Hoffman, South Orange, N. J., and George P. Clement, New York, N. Y., assignors to Worthington Pump and Machinery Corporation, Harrison, N. J., a corporation of Delaware Application January 21, 1948, Serial No. 3,574

9 Claims. (Cl. 210—16)

This invention relates to the art of water purification and, in particular, refers to apparatus for mixing raw water, chemicals, and slurry. It constitutes an improvement in the basic apparatus described and claimed in a copending application of George P. Clement entitled "Cold Process Water Softener" and filed January 21, 1948, Serial No. 3511.

In apparatus according to said application, as well as in apparatus according to the prior art, fluid within the treating tank is divided by suitable partitions into a reaction zone and a separation zone. Raw water, chemicals, and slurry are mixed together in the reaction zone so that undesirable constituents in the water are precipitated. It has been found that by recirculating the fluid within the reaction zone that a very efficient and complete precipitation of undesired constituents is obtained, the precipitated particles being subsequently separated from the treated water as the fluid passes through the separation zone. In the said application a new and improved method of actuating recirculatory flow within the reaction zone is disclosed. This comprises the establishment of a vortex and the utilization of the pressure difference therein to force recirculation in the reaction zone. The object of the instant invention is to utilize the pressure difference between the vortex and fluid in the separation zone to recirculate solids between the separation and reaction zones. Such recirculation of the solids from the separation zone is known to have a beneficial effect on the purification process.

The apparatus for accomplishing this object will be specifically described in connection with the accompanying drawing which is a longitudinal section through a preferred form of the invention.

The improved apparatus has a main tank or receptacle 1 in which is suitably mounted a hollow casing or hood 3 which may be of inverted cup shape as shown or of many other slopes such as indicated in the aforementioned application of George P. Clement. Within the casing 3, and preferably concentric therewith, is a second hollow casing 5. This may have its lower end entirely open as indicated at 7 and has its upper end substantially closed so that there is only a central inlet opening 9 therein. Between the casings is the annular passage 8 connecting openings 7 and 9 which may have flow guiding vanes 10 therein. Raw water inlet pipes 11a are tangentially arranged around the inner periphery of the casing 5 and terminate in nozzles 11 so that the raw water enters in non-radial jets having large lateral components of velocity—all as described in the Clement application. The raw water inlet pipes 11a receive raw water from any suitable source (not shown) outside the apparatus.

The space within and beneath the casing 3 comprises the reaction zone R which may be thought of as comprising a mixing chamber within the casing 5 and a recirculation chamber in the remainder of the zone. In this zone mixing of the raw water, chemicals, and previously precipitated particles of slurry takes place. Separation of the precipitated constituents occurs in the separation zone S which may for the purpose of this application be considered as comprising the remainder of the space in the tank 1 outside of the reaction zone. The lower part of this zone is connected to the reaction zone R by means of the annular passage 15 surrounding the casing 3 and communicating with the bottom thereof. This may have suitable flow guiding vanes 17 therein.

Toward the top of the separation zone the usual floc bed or slurry blanket 19 is maintained. Substantially level with the interface between the slurry blanket and the clarified water above is the top of a floc concentrator 21 which is simply a hollow casing having a blow-off connection 23 to points outside of the tank 1. A pipe 25 has an inlet 27 in the concentrator 21 and extends down through the casing 3 into the reaction zone R so that its outlet 29 is in communication with the inlet opening 9 of the inner casing 5. A valve 31, controlled from the outside of the tank 1 as shown at 33, may be incorporated in the pipe line 25 to regulate the flow.

In operation, the raw water entering the reaction zone through nozzles 11 sets up a vortex in the casing 5. Pressure in the casing is therefore greatest near the periphery and lowest near the axis. The fluid flows out of the peripheral portions of the opening 7 and an amount equal to the throughput of the apparatus flows up through annular passage 15 into the separation zone. The remaining amount is the recirculated fluid which flows up through the annular passage 8 into inlet opening 9 since this opening is at a lower pressure than the fluid leaving the casing through the opening 7. Preferably the vanes 10 are constructed to arrest rotary motion of the fluid so that the fluid entering opening 9 has substantially linear flow. The fluid is then caught in the vortex in the casing 5 and thrown outwardly and downwardly to again follow the flow paths just indicated. The chemicals entering through pipe 13 are also caught up in the circulating body of fluid and are thoroughly mixed with the raw water. Precipitated particles resulting from this mixture and the subsequent chemical reaction are also recirculated with the body of fluid and serve as nuclei to hasten and facilitate precipitation.

The fluid which passes into the separation zone S through the passage 15 comprises a mixture of softened water and slurry particles. This mixture rises to the floc bed 19 where the solids are filtered out. Clarified water thus issues from the top of the slurry blanket interface and flows by suitable means to the point of usage. Slurry particles slide over the top edge of the casing 21 and accumulate in the concentrator from which they can be removed through blow out line 23 which therefore forms a convenient means for controlling the concentration of slurry in the tank 1.

As those in the art know, it is considered beneficial to be able to recirculate the slurry particles in the floc bed 19 through the reaction zone R. This can be easily done in this invention by means of the pipe 25. Since this pipe has its outlet 29 in the low pressure region of the vortex in the reaction zone, slurry in the concentrator 21 will enter it through the inlet 27 and flow down to the casing 5 where it is again mixed with the chemicals, raw water, and slurry recirculating in the reaction zone. Obviously, instead of being in the concentrator 21, the inlet 27 of the pipe 25 could be located at any other desired position near or in the floc bed 19 so as to withdraw or skim off the desired solids from the separation zone. The rate of withdrawal may be regulated by means of the valve 31 through its external stem 33.

As indicated in the Clement application, a rotative paddle wheel 35 may be mounted in the casing 5 to form or assist in the formation of the vortex. This is rotated by suitable means (not shown) applied to its stem 37 which extends up through pipe 25 to the outside of the tank 1.

It will now be realized that the aforesaid object of this invention, i. e., to effect recirculation of separated solids by means of the difference in pressure between the separation zone and the vortex in the reaction zone, has been accomplished because of the conduit connection 25 between the floc bed 19 and the center of the vortex. The particular construction and arrangement of this connection and the other physical elements of apparatus according to the invention are, of course, not restricted to the specific embodiment illustrated but may be widely modified within the scope of the appended claims.

What is claimed is:

1. In a cold process water treating apparatus, a receptacle having a treated water collection zone and an outlet for treated water, a hood in said receptacle and forming a reaction zone within the hood and a separation zone exteriorly of the hood, a hollow casing within said hood forming a mixing chamber and having its lower end open and its upper end provided with a restricted inlet opening, said hood and casing spaced from the sidewalls of said receptacle to form lateral and annular upwardly extending flow passages between the reaction zone and the settling zone, said hollow casing spaced from said hood to form an annular upward flow passage from said lateral flow passage into the reaction zone above said hollow casing, means for delivering chemical reagents to said mixing chamber, means for delivering raw water to be treated into the mixing chamber, and means in said mixing chamber for agitating and mixing raw water and chemicals in the mixing chamber.

2. A cold process water treating apparatus as claimed in claim 1 wherein said means for delivering raw water into said mixing chamber and said means for agitating and mixing raw water and chemicals in the mixing chamber constitutes a raw water inlet pipe and a plurality of nozzles connected to said raw water inlet pipe and extending tangentially into said mixing chamber.

3. A cold process water treating apparatus as claimed in claim 1 wherein said means for delivering raw water into said mixing chamber and said means for agitating and mixing raw water and chemicals in the mixing chamber constitutes a raw water inlet pipe and a plurality of nozzles connected to said raw water inlet pipe and extending tangentially into said mixing chamber, and said mixing means further including a rotative paddle wheel located in said mixing chamber.

4. A cold process water treating apparatus as claimed in claim 1 including a floc concentrator having its inlet opening into said separation zone and having an outlet for floc, and a pipe having its inlet located in said floc concentrator below the inlet thereof and its outlet opening into said mixing chamber for returning a limited quantity of precipitated floc to the mixing chamber.

5. A cold process water treating apparatus as claimed in claim 1 including a floc concentrator having its inlet opening into said separation zone and having an outlet for floc, and a pipe having its inlet located in said floc concentrator below the inlet thereof and its outlet opening into said mixing chamber for returning a limited quantity of precipitated floc to the mixing chamber, and a manually operated valve in said pipe for controlling the quantity of floc delivered to the mixing chamber.

6. A cold process water treating apparatus as claimed in claim 1 wherein said means for delivering raw water into said mixing chamber and said means for agitating and mixing raw water and chemicals in the mixing chamber constitutes a raw water inlet pipe and a plurality of nozzles connected to said raw water inlet pipe and extending tangentially into said mixing chamber, a floc concentrator having its inlet opening into said separation zone and having an outlet for floc, and a pipe having its inlet located in said floc concentrator below the inlet thereof and its outlet opening into said mixing chamber for returning precipitated floc to the mixing chamber.

7. A cold process water treating apparatus as claimed in claim 1 wherein said means for delivering raw water into said mixing chamber and said means for agitating and mixing raw water and chemicals in the mixing chamber constitutes a raw water inlet pipe and a plurality of nozzles connected to said raw water inlet pipe and extending tangentially into said mixing chamber, a floc concentrator having its inlet opening into said separation zone and having an outlet for floc, and a pipe having its inlet located in said floc concentrator below the inlet thereof and its outlet opening into said mixing chamber for returning precipitated floc to the mixing chamber, and a valve in said pipe for controlling the quantity of floc delivered to the mixing chamber.

8. In a cold process water treating apparatus, a receptacle having a treated water collection zone and an outlet for treated water, a hood in said receptacle and forming a reaction zone within the hood and a separation zone exteriorly of the hood, a hollow casing within said hood forming a mixing chamber and having its lower end open and its upper end provided with a restricted inlet opening, said hood and casing spaced from the sidewalls of said receptacle to form lateral and annular upwardly extending flow passages between the reaction zone and the settling zone, said hollow casing spaced from said hood to form an annular upward flow passage from said lateral flow passage into the reaction zone above said hollow casing, means for delivering chemical reagents to said mixing chamber, means for delivering raw water to be treated into the mixing chamber, and means in said mixing chamber for agitating and mixing raw water and chemicals in the mixing chamber, and flow guiding vanes in said lateral flow passage.

9. In a cold process water treating apparatus, a receptacle having a treated water collection zone and an outlet for treated water, a hood in said receptacle and forming a reaction zone within the hood and a separation zone exteriorly of the hood, a hollow casing within said hood forming a mixing chamber and having its lower end open and its upper end provided with a restricted inlet opening, said hood and casing spaced from the sidewalls of said receptacle to form lateral and annular upwardly extending flow passages between the reaction zone, said hollow casing spaced from said hood to form an annular upward flow passage from said lateral flow passage into the reaction zone above said hollow casing, means for delivering chemical reagents to said mixing chamber, means for delivering raw water to be treated into the mixing chamber, and means in said mixing chamber for agitating and mixing raw water and chemicals in the mixing chamber, flow guiding vanes in said lateral flow passage, and flow guiding vanes in said annular upwardly extending flow passage.

ROBERT F. HOFFMAN.
GEORGE P. CLEMENT.

REFERENCES CITED

The following references are of record in the file of this patent:

UNITED STATES PATENTS

| Number | Name | Date |
| --- | --- | --- |
| 1,864,866 | Snow | June 28, 1932 |
| 2,348,124 | Green | May 2, 1944 |
| 2,352,772 | Darby | July 4, 1944 |
| 2,364,023 | Green | Nov. 28, 1944 |
| 2,383,086 | Sebald | Aug. 21, 1945 |
| 2,391,697 | Green | Dec. 25, 1945 |
| 2,391,738 | Prager | Dec. 25, 1945 |
| 2,411,386 | Parker et al. | Nov. 19, 1946 |
| 2,427,886 | Walker | Sept. 23, 1947 |
| 2,464,617 | Sebald | Mar. 15, 1949 |